J. F. TOTH.
MAP INDICATOR.
APPLICATION FILED DEC. 4, 1917.
1,276,835.
Patented Aug. 27, 1918.
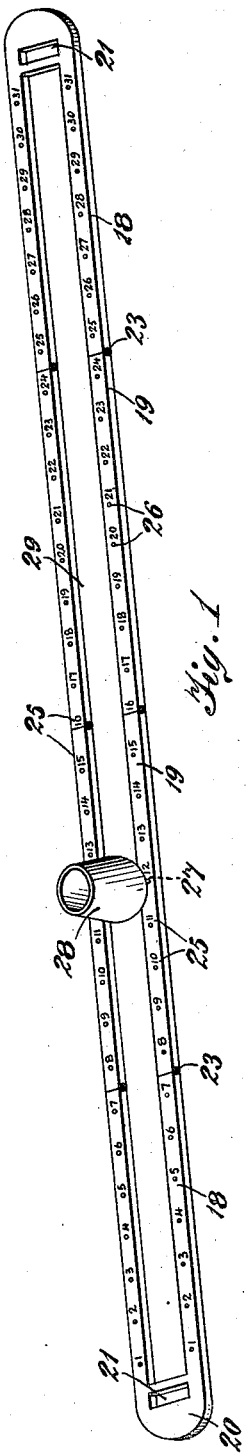
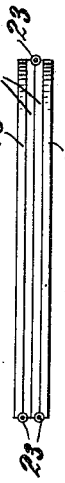
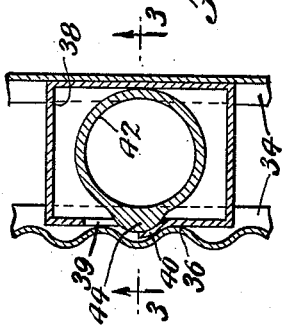
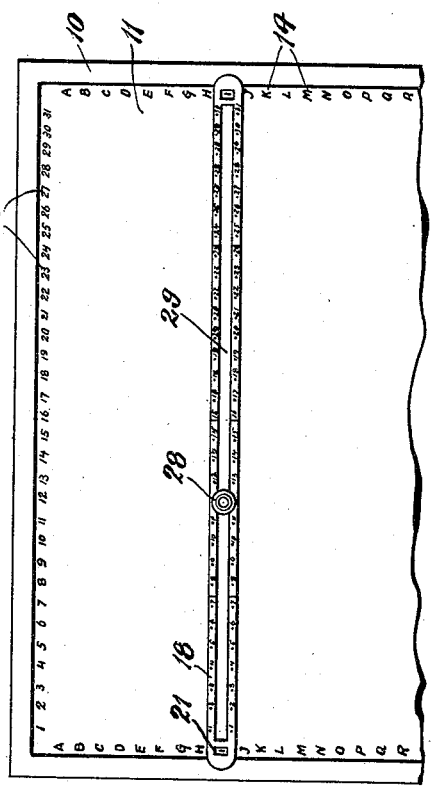
Inventor
J. FRED. TOTH
By his Attorney

UNITED STATES PATENT OFFICE.

JOE FRED TOTH, OF DETROIT, MICHIGAN.

MAP-INDICATOR.

1,276,835.    Specification of Letters Patent.    Patented Aug. 27, 1918.

Application filed December 4, 1917. Serial No. 205,382.

*To all whom it may concern:*

Be it known that I, JOE FRED TOTH, a subject of the King of Hungary, resident of Detroit, county of Wayne, and State of Michigan, have invented certain new and useful Improvements in Map-Indicators, of which the following is a specification.

This invention relates to improvements in means for finding desired locations on a map and has as its special object the provision of means by which such location can be determined in an easy and rapid manner in connection with a key or index and marginal notations on the map.

A further object is to provide such means in forms which can be compactly folded, so as to be carried in the pocket without inconvenience.

A still further object is to provide an adjustment which can be maintained when in a desired position in a novel manner.

These and other like objects are attained by the novel construction and combination of parts hereafter described and shown in the accompanying drawing, forming a material part of this specification, and in which:—

Figure 1 is a perspective view showing an indicator made in accordance with the invention.

Fig. 2 is a side elevation of the same in a folded position.

Fig. 3 is an enlarged transverse sectional view taken substantially on line 3—3 of Fig. 4 and showing a modification in construction.

Fig. 4 is a fragmental longitudinal sectional view taken on line 4—4 of Fig. 3, and Fig. 5 is a fragmental plan view indicating the application of the invention.

From the drawings it will be understood that the invention is applicable to any map provided with a key to be used in connection with significant characters as commonly imprinted upon the margin of a map, here shown to have a row of alphabetical characters disposed in columns on each side, while equally spaced numerals are imprinted upon the top and bottom margins as is common in a map of this character.

In the drawings the numeral 10, refers to a backing or support for the map 11, upon the marginal side edges of which are alphabetical characters 14, numerals 15 appearing at the top and bottom. The indicator bar is composed of a plurality of sectional elements 18 and 19, the former having rounded ends 20, through which are formed transverse slots 21, registerable with the alphabetical characters 14, upon the side margins, the sections being connected by hinges 23, in such manner as to permit the same to be folded as indicated in Fig. 2.

Formed on the outer surface of the indicator bar are rows of numerals 25, the same corresponding to the numerals 15 disposed upon the upper and lower edges of the map, and closely adjacent to each of the numerals are formed indentations 26, receivable of a spring finger 27, carried on the eye piece 28, slidable longitudinally of the bar, in the recess 29, which extends through each of the sections.

In Figs. 3 and 4 a modification of the indicator bar is shown in which the several sections 32, are formed with inturned flanges 33 and 34, respectively at the top and bottom, one of the sides 35 being formed with a continuous series of undulating sinuous curves, the inner convolutions 36 of which are uniformly spaced to agree with the characters 15.

Engaged with the flanges 33 and 34, and the side edges 32 and 35 is a slide 38, rectangular in cross section and having a slotted opening 39 contiguous to the corrugations 36 which are receivable of an extending spring tongue 40, formed with one of the outer elements of the slide 38, and which normally extend parallel with the side so the slide can be easily moved from end to end of the bar.

In order, however, to lock the slide in an adjusted position, the eye piece 42, which contains the lens 43, is formed with a projection 44, extending from the ring 45, so as the latter is turned, together with the eyepiece, the projection 44 engages with the spring detent 40, pressing the same outward into the corrugations in any desired position.

In operation the map having been mounted as indicated, the indicator bar is placed upon its face in such manner that the openings 21 register with the alphabetical characters 14 and then in accordance with a key provided with the map, the bar is adjusted until the proper alphabetical character appears through the openings 21, whereupon the eye-piece 28 or 42 is moved longitudinally of the bar until the index fingers 27 or projection 44, registers with the indicated numeral in the rows 15, whereupon the eyepiece is known to be located for observation to be taken therethrough; thus a desired locality may be ascertained without the necessity of marking the map or the use of the ruler, as is common.

Having thus described my invention what I claim as new and desire to secure by Letters Patent is:—

1. A map indicator comprising a map having marginal characters, a bar having a longitudinal slot therethrough and openings at the ends thereof registerable with the characters upon the margin of said map, and an eye piece adjustable along said bar registerable with characters upon the surface of said map.

2. In a map indicator, the combination with a map having marginal characters, of a bar comprised of a plurality of joined elements having a longitudinal slot extending from end to end therein, there being transverse slots formed in the ends of said bar through which the mentioned characters can be seen, an eye piece movable longitudinally in the mentioned longitudinal slot, and means for holding said eye piece in engagement at intervals in said slot.

3. In a map indicator, the combination with a slotted bar having one internal sinuous edge, a slide movable in said slot, a resilient arm formed with said slide, an eye piece rotatable in said slide, and means carried by said eye piece adapted to force said arm outwardly into engagement with any of the sinuosities in the mentioned internal edge.

4. In a map indicator, the combination with a map having marginal characters along all of its edges, of an indicator bar slidable over the face of said map, said indicator bar having openings at its ends registerable with the characters upon the end edges of said map, a slide movable in said indicator bar, a plurality of uniformly spaced sinuosities formed in one of the longitudinal sides of said bar, a guide movable in said bar, a detent formed in said guide engageable with any of the mentioned sinuosities, an eye piece rotatably mounted in said slide, and means whereby said eye piece may force said detent outward into engagement with the sinuosities.

In testimony whereof I have affixed my signature.

J. FRED TOTH.

Copies of this patent may be obtained for five cents each, by addressing the "Commissioner of Patents, Washington, D. C."